(12) United States Patent
McMiles et al.

(10) Patent No.: US 8,998,150 B2
(45) Date of Patent: Apr. 7, 2015

(54) RETROFIT CLAMP FOR MUX, UMBILICALS AND IWOCS

(75) Inventors: Barry McMiles, Katy, TX (US);
Thomas Cates, Houston, TX (US)

(73) Assignee: The Subsea Company, Houston, TX (US)

(\*) Notice: Subject to any disclaimer, the term of this patent is extended or adjusted under 35 U.S.C. 154(b) by 142 days.

(21) Appl. No.: 13/016,212

(22) Filed: Jan. 28, 2011

(65) Prior Publication Data

US 2011/0186693 A1 Aug. 4, 2011

Related U.S. Application Data

(60) Provisional application No. 61/299,547, filed on Jan. 29, 2010.

(51) Int. Cl.
*F16L 3/08* (2006.01)

(52) U.S. Cl.
CPC .......................................... *F16L 3/08* (2013.01)

(58) Field of Classification Search
USPC ............ 248/65, 68.1, 49, 63, 73, 74.1, 309.1, 248/316.1, 316.2, 220.21, 220.22, 229.21, 248/228.2, 230.2, 231.31; 24/20 R, 25, 16 R, 24/68 R See application file for complete search history.

(56) References Cited

U.S. PATENT DOCUMENTS

| | | | | |
|---|---|---|---|---|
| 4,437,791 A | * | 3/1984 | Reynolds | 405/224.2 |
| 4,506,418 A | * | 3/1985 | Viola et al. | 24/277 |
| 5,131,856 A | * | 7/1992 | Auclair | 439/100 |
| 6,431,502 B1 | * | 8/2002 | Goodman | 248/74.1 |
| 2008/0283687 A1 | * | 11/2008 | McClure et al. | 248/74.1 |

\* cited by examiner

*Primary Examiner* — Todd M Epps

(57) ABSTRACT

A clamp for placement about a riser having an assembly with a housing for releasably engaging at least one strap, the strap having a first and second end wherein the first and second ends are releasably attached to the housing, a plate on the housing for selectively engaging the first and second ends of the strap; and a support operably connected to the housing for releasably holding MUX, IWOC and other umbilical cables used in subsea applications. The housing may have two straps for engagement to a riser that shorten and lengthen by the turning of a screw through a plate engaged to the straps. The clamp may also have a hinged or fixed circular member for attachment around the riser. The cables are held by a hinged attachment to the housing that forms cylindrical vertical openings upon closure of the hinge.

16 Claims, 7 Drawing Sheets

RETROFIT CLAMP FOR MUX, UMBILICALS AND IWOCS

RELATED APPLICATION DATA

Claim to Priority

This application claims priority from U.S. Provisional Patent Application Ser. No. 61/299,547 entitled "Coupling Member" filed Jan. 29, 2010 and is incorporated by reference herein.

FIELD OF THE INVENTION

The present invention relates to coupling mechanisms for oil and gas processes and related apparatuses. More specifically the present application discloses an invention which is employed for coupling communication lines and other apparatuses which pertain to riser joints and those which allow control of blowout preventers ("BOP") and other related wellhead control devices.

BACKGROUND OF THE INVENTION

Currently mechanisms which bind various well control lines to drill strings fall short of effectively coupling components which are used in drilling and production of oil, gas, and other minerals. Components which supply communication to various portions of BOPs, well heads, subsea production trees, and associated members often do so through communication lines which supply fluid, pressure, electronic communication, and allow for physical manipulation of the BOP, well head, subsea production tree and associated tools. Unfortunately, communication lines inadequately couple to components which are run subsea. When communication lines are inadequately coupled to the riser string, the various components are at risk of being damaged and are rendered inoperable.

In an underwater drilling rig riser, multiple lines are integrated in the rig riser. These include multiplexed (MUX) hydraulic lines, choke lines, boost lines, an Installation/Workover Control Systems (IWOCS) line, and other umbilical lines. In conventional installations, the failure of a riser or its release from the subsea installation due to tripping of a blowout preventer cuts these various lines as they are integrated in the riser. The present invention presents an improved riser clamp to securely hold the various lines in place typically as a retrofit as well as allowing for the selective release of the all important IWOCS line away from the riser for easy replacement or continued control of the subsurface wellhead assembly.

Presently numerous coupling mechanisms fail to appropriately couple communication lines and allow for interference from physical damage, and sometimes even sea life in subsea applications. In certain instances, movement of communication lines and drill string through subsea currents are believed to attract aquatic life, and from time to time have been retrieved with bite marks.

Sometimes, communication lines are attached to various segments of a riser. When a riser and various pipes are lowered and raised from drilling and/or work-over rigs a coupling mechanism is mounted to riser joints at inappropriate locations which causes extra pauses during the runs to attached said lines and therefore increasing the deployment times dramatically. Then, a communication line is subsequently coupled to the coupling mechanism. This is somewhat problematic, due to rig day-rate costs and auxiliary services employed in drilling and servicing oil wells.

Floatation (Buoyancy) is fitted to the riser in deepwater drilling to reduce the overall weight of the riser string and allow deployment of such in a reasonable manner. In some cases "cutouts" or cavities are provided in the floatation to allow for the mounting of the control cable clamps at an appropriate location so that the cables/hoses can be attached in conjunction with the addition of the next joint of riser, but this is not always the case. Where the floatation is not supplied with this feature the clamps have to be fitted either above or below the floatation which adds an extra stopping point for each joint during the run, thus adding an inordinate amount of time to the riser run. The design of this clamp allows the positioning of the clamp along the full length of the joint without the need of a cutout or a cavity. This allows the positioning of the clamp to be coordinated with the landing point of each joint so that the cables/hoses can be attached simultaneously with the adding of the next joint of riser thus greatly reducing the run time of the riser.

SUMMARY OF THE INVENTION

In accordance with a preferred embodiment of the invention there is shown a clamp for placement about a riser having an assembly with a housing for releasably engaging at least one strap, the strap having a first and second end wherein the first and second ends are releasably attached to the housing, a plate on the housing for selectively engaging the first and second ends of the strap, and a support operably connected to the housing for releasably holding at least one cable.

In accordance with another preferred embodiment of the invention there is shown a clamp for placement about a riser having an assembly with a housing for releasably engaging at least one generally circular member, the circular member having a male protrusion to engage a rotating shaft in said housing, and a support operably connected to the housing for releasably holding at least one cable.

In accordance with another preferred embodiment of the invention there is shown a clamp for placement about a riser having an assembly with a housing for releasably engaging at least one generally circular strap, a mount in said housing for selectively engaging said strap; and a support operably connected to said housing for releasably holding at least one cable.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
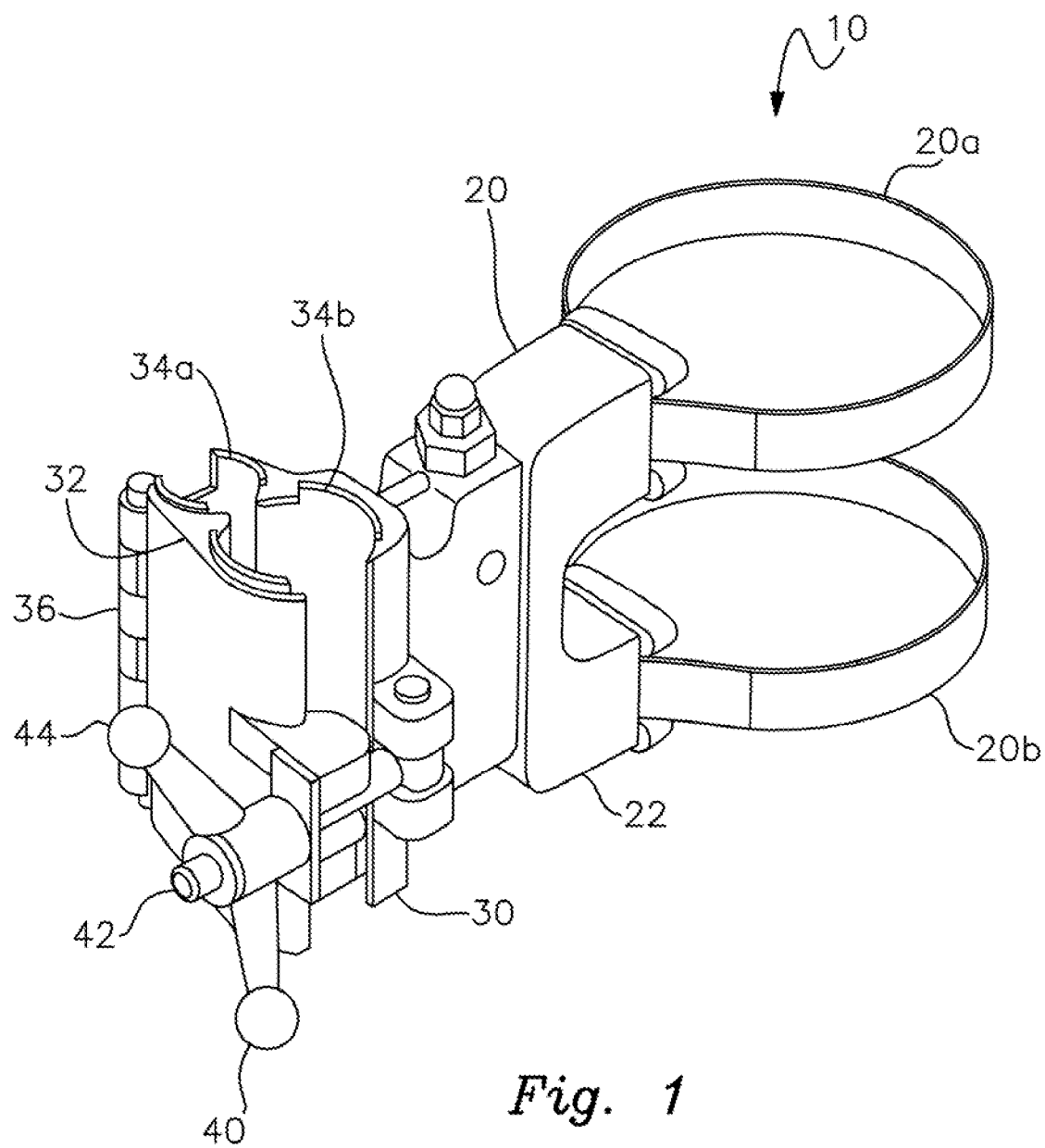
FIG. 1 shows a perspective view of an assembly of a preferred embodiment of the present invention.

Referring now to FIG. 1, a perspective view of a preferred embodiment of the present application is illustrated. A coupling member 10 includes strapping assembly 20, communication grasp 30, and swivel assembly 42 for assisting in coupling a communication member (not shown) by communication grasp 30. In a preferred embodiment of the present application strapping assembly 20 includes opposing straps 20a and 20b that align substantially parallel to one another and are disposed to circumferentially surround another member such as a drill string or pipe component. Straps 20a and 20b may be of any of a variety of materials including composite, rubber, synthetic, or metallic. Strapping assembly 20 includes a bracket member 22 for coupling one or more straps 20a and 20b. Bracket member 22 includes receiving portions for drawing tension via straps 20a and 20b. Bracket member 22 includes grooves for adapting one or more straps 20a and 20b.

Communication grasp 30 couples to bracket member 22 and is fashioned to receive one or more communication lines. Communication grasp 30 includes a clamping portion 32 that includes channels 34a and 34b. Clamping portion 32 includes a hinging apparatus 36 for allowing communication lines having various diameters to be adapted to coupling member 10. Components of clamping portion 32 are adapted to receive swivel assembly 42. Swivel assembly 42 includes a first swivel member 40 and a second swivel member 44. Swivel member 44 is optionally spring loaded to apply tension and couple communication lines about channels 34a and 34b of communication grasp 30.

In one mode of operation, straps 20a and 20b remain in an open position about strapping assembly 20. Coupling member 10 is adapted about a substantially circumferential body. Straps 20a and 20b are then drawn around a substantially circumferential body in tension via strapping assembly 20 and optionally pulled or ratcheted to create additional tension about a substantially circumferential body. Communication lines are secured about communication grasp 30. Communication grasp 30 receives communication lines via channels 34a and 34b. Swivel assembly 42 is positioned to allow for containment of communication lines. Once communication lines are disposed within channels 34a and 34b, swivel member 40 is pivoted towards swivel assembly 42. Swivel member 40 is subsequently secured against swivel assembly 42, via swivel member 44. In an instance in which communication lines are not aligned with the direction of a substantially circumferential body, strapping assembly 20 and swivel assembly 42 are allowed to pivot about one another while securing communication lines and a substantially circumferential body. In the event that strapping assembly 20 and swivel assembly 42 need to be immediately separated from one another, in certain embodiments, their coupling methodology may allow for the severance of each component.

Figure 2A:
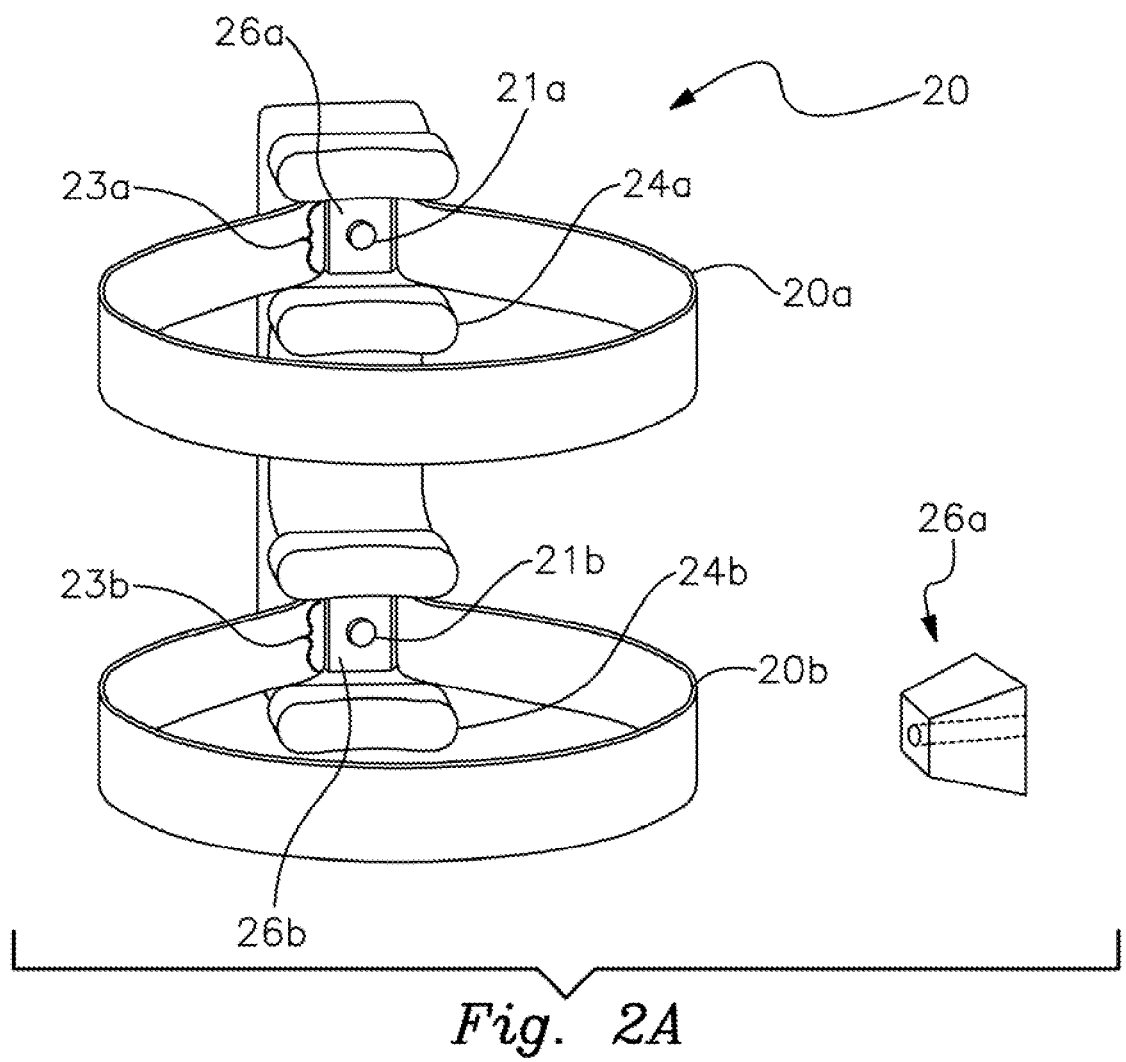
FIG. 2A shows a perspective view of a portion of the assembly of a preferred embodiment of the present invention.

Referring now to FIG. 2a, a view of a strapping assembly 20 is illustrated. As is shown, strapping assembly 20 is illustrated having strap 20a and strap 20b in a "closed" position as if each were surrounding a circumferential component. Accordingly, set screw 21a and set screw 21b are positioned to retract and deploy first strap 20a and second strap 20b. Once strap 20a or strap 20b is within the confines of channels 23a and 23b, set screws 21a and 21b may be rotated, allowing tension to be drawn about straps 20a and 20b. Straps 20a and 20b may be fitted with a grommet on each of the strap that engages screws 21a and 21b for selective movement of the strap thereby tightening and loosening the straps about the riser. Alternatively, straps 20a and 20b may have one end that is fixed to strapping assembly 20 and a second end that is fitted with a grommet for engagement to screws 21a or 21b. In the event that it is desirable to draw tension about strap 20a and 20b, set screws 21a and 21b may be rotated in order to draw straps 20a and 20b within the confines of channels 23a and 23b to tighten the strap about the riser. In the event that it is desirable to partially or fully release tension from straps 20a and 20b, from the confines of channels 23a and 23b, set screws 21a and 21b may be rotated to allow tension to be released from the detent in which each screw is selectively disposed. Screws 21a and 21b may be threaded through plates 26a and 26b respectively so that upon engagement of said screws, the plate moves inward and outward along the shaft of the screw. By doing so, the straps are pulled inward and tightened or loosened. Plates 26a and 26b may be of a variety of configurations including a tapered square wedge, as shown in the inset of FIG. 2A, which facilitates locking the straps in place into a reciprocal void that may be tapered or not.

As is readily apparent to one of ordinary skill, the straps may alternatively be engaged to the housing by other means including a ratcheting mechanism that engages the plate or straps alone to pull them inward to the housing.

Strapping assembly 20 includes stabilizing members 24a and 24b which align about straps 20a and 20b. Stabilizing members 24a and 24b assist in aligning strapping assembly 20 both about the bottom and top of straps 20a and 20b. Through including stabilizing members about the bottom and top of straps 20a and 20b, drifting and walking of coupling member 10 is prevented when extraneous forces are exerted.

Figure 2B:
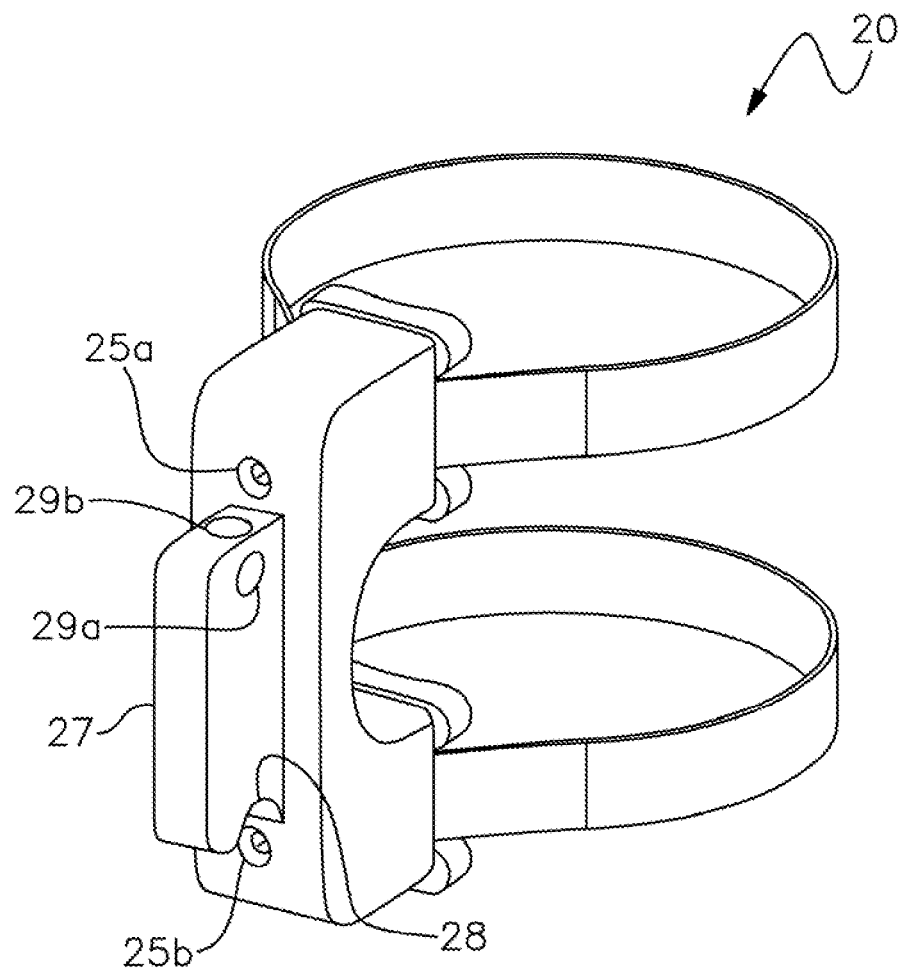
FIG. 2B shows an alternative perspective view of a portion of the assembly of a preferred embodiment of the present invention.

Referring now to FIG. 2b, an alternative view of strapping assembly 20 as shown in FIG. 2a, is illustrated. Accordingly, detents or voids 25a and 25b are illustrated for communicating with set screws 21a and 21b (not illustrated). In certain embodiments, communication grasp 30 may be separated from strapping assembly 20 to allow for manipulation of set screws 21a and 21b (not illustrated). Similarly, an adapting member 27 for coupling communication member 30 (not illustrated) and strapping assembly 20 is illustrated. Adapting member 27 includes indentation 28, for preventing slippage between communication member 30 and strapping assembly 20. Adapting member 27 also includes aperture 29a which is disposed parallel to the longitudinal axis of communication member 30. Adapting member 27 also includes aperture 29b, which is disposed normal to the longitudinal axis of communication member 30. Insert (not pictured) may be disposed within apertures 29a and 29b in order to allow removable coupling of communication grasp 30 and strapping assembly 20.

Figure 3:
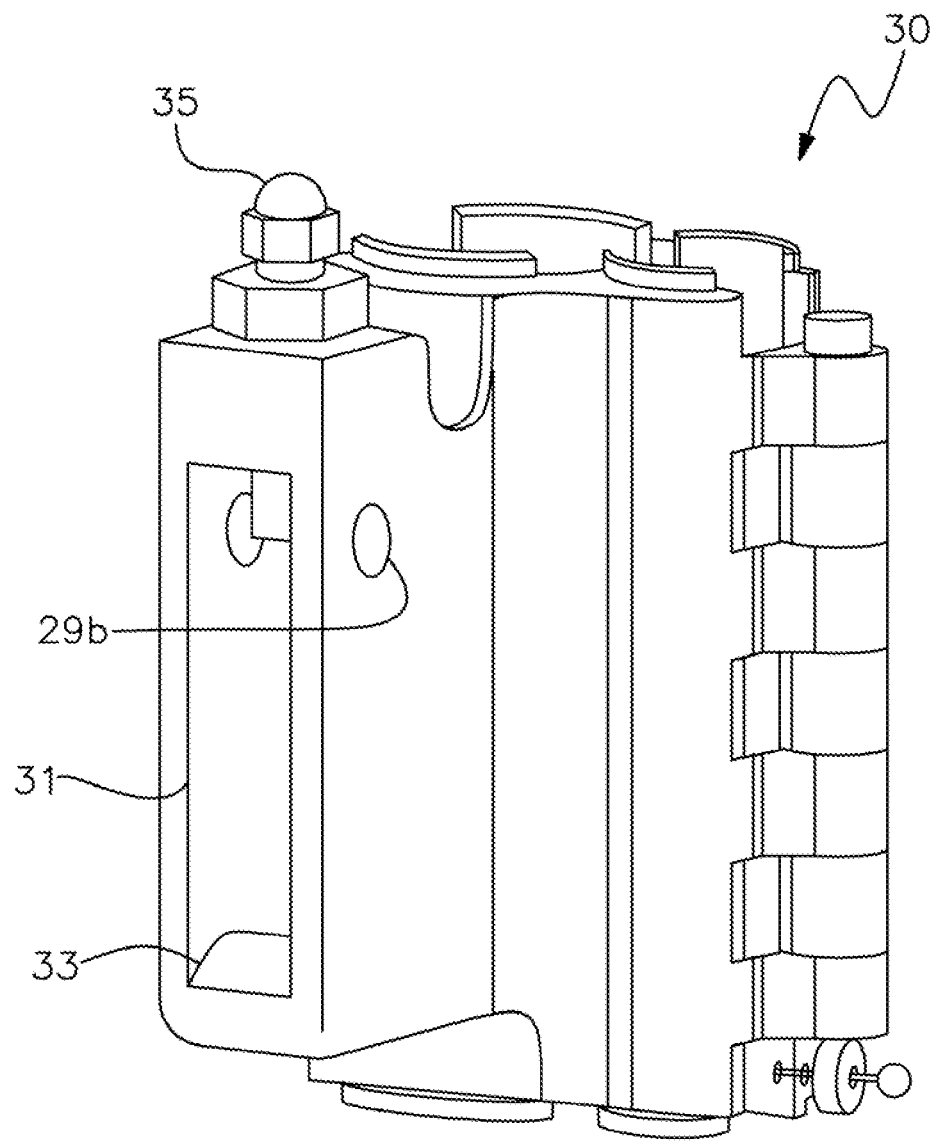
FIG. 3 shows another perspective view of a portion of the assembly of a preferred embodiment of the present invention.

Referring now to FIG. 3, a view of communication grasp 30 is illustrated. As is illustrated, communication grasp 30, includes a receiving aperture 31 for allowing coupling of strapping assembly 20 via adapting member 27 (shown in FIG. 2b). When strapping assembly 20 couples to communication grasp 30, indentation 28 (shown in FIG. 2b) mates with ridge 33. Ridge 33 allows for a slip fitting of communication grasp 30 and strapping assembly 20. Once communication grasp 30 and strapping assembly 20 fully abut one another, a securing pin (not shown) may be inserted into aperture 29b, while locking pin 35 may be disposed within aperture 29a (shown in FIG. 2b) to securely couple strapping assembly 20 and communication grasp 30.

Figure 4:
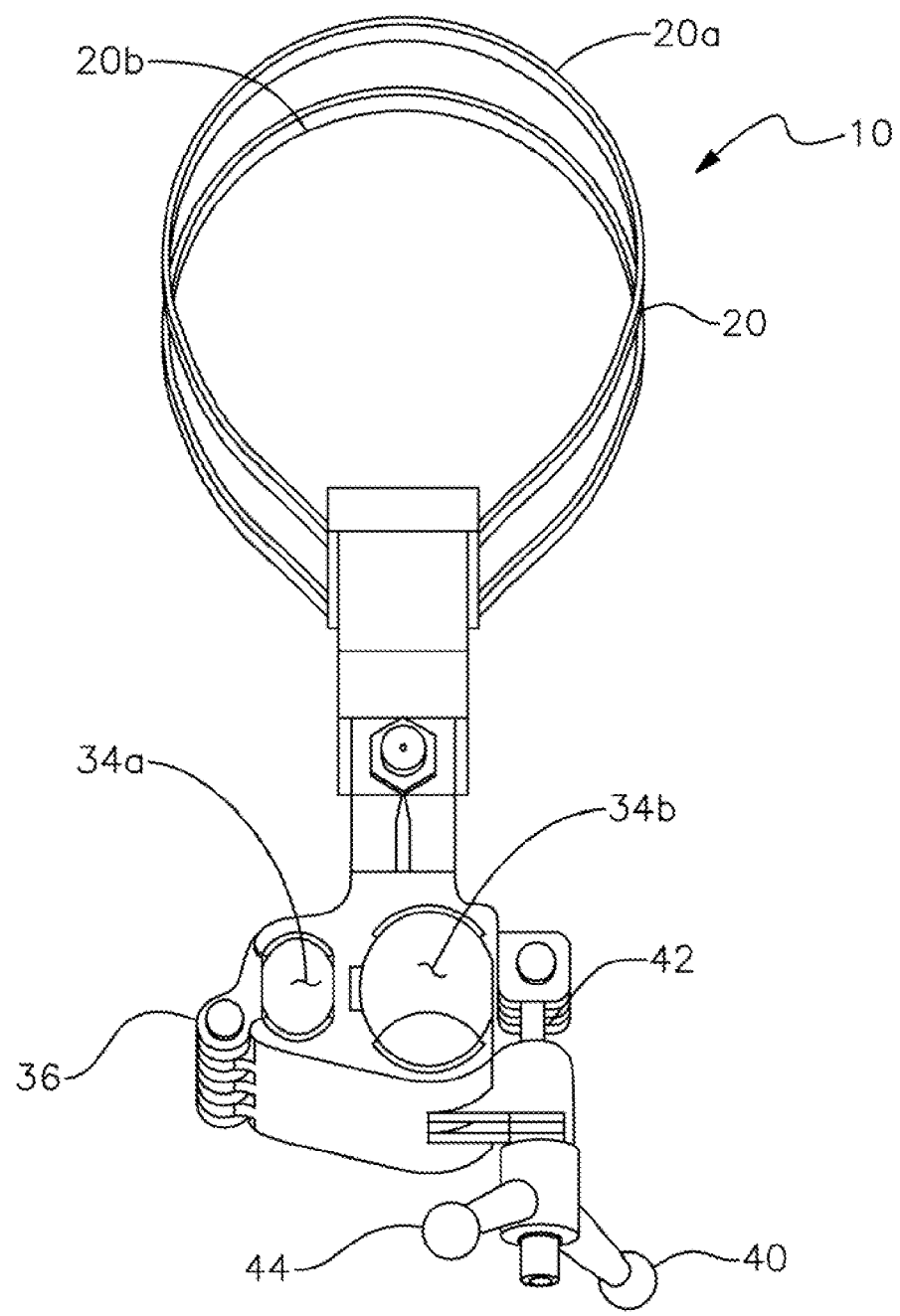
FIG. 4 shows an overhead perspective view of the assembly of a preferred embodiment of the present invention.

Referring now to FIG. 4, an alternative view of coupling member 10 is illustrated. As is shown, communication grasp 30 includes parallel channels which are substantially cylindrical and hollow. Channel 34a incorporates a slightly smaller diameter than channel 34b. Swivel assembly 42 secures communication and other lines (not pictured) via swivel member 44 and swivel member 40 through coupling components of hinging apparatus 36 in a substantially perpendicular manner. Strapping assembly 20 as well as straps 20a and 20b along with channels 34a and 34b are all substantially aligned. When swivel assembly 42 secures communication lines via hinging apparatus 36 in the depicted orientation, each of the communication lines align the substantially perpendicular to the longitudinal orientation of swivel assembly 42.

Figure 5:
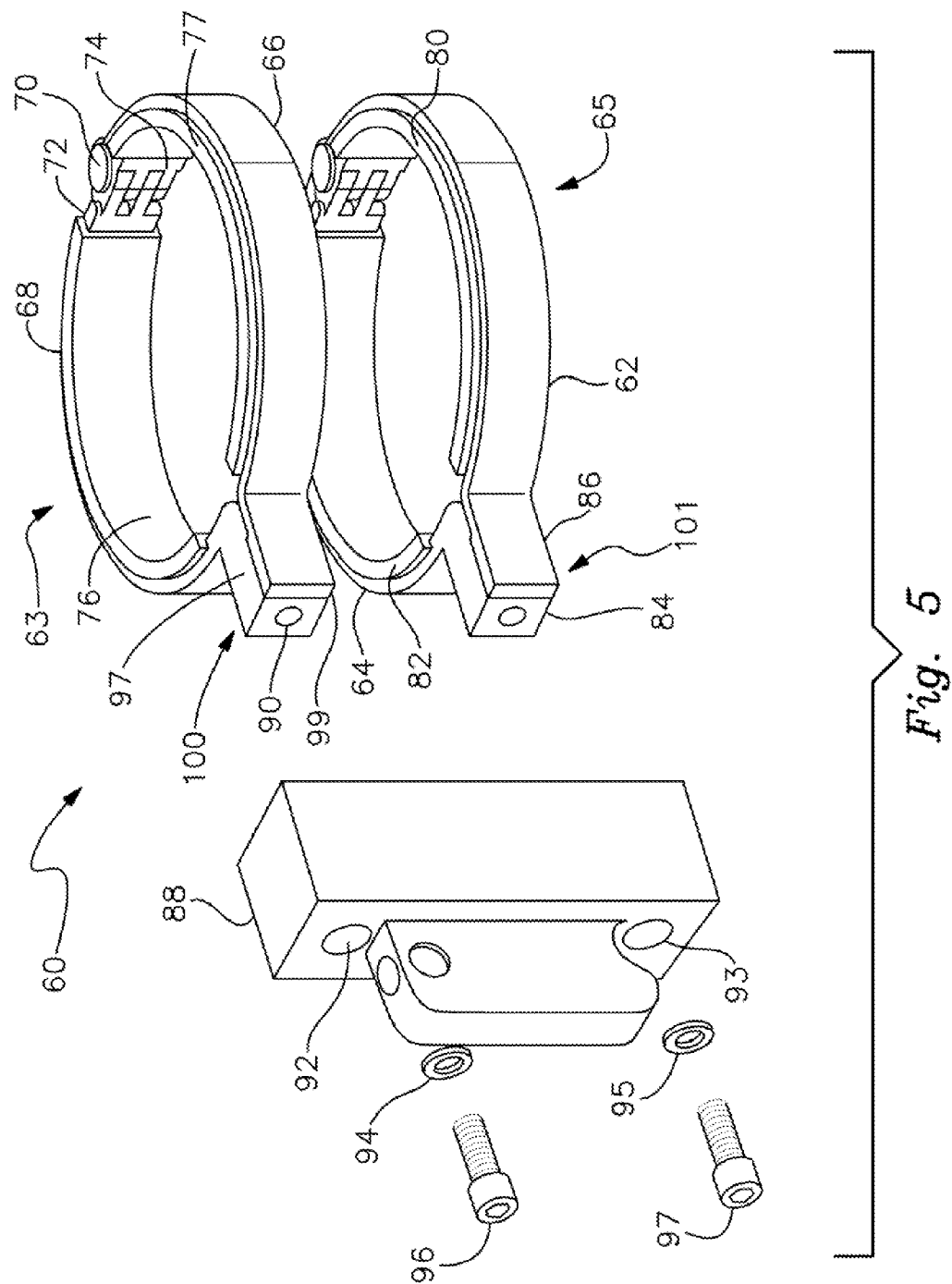
FIG. 5 shows a perspective view of an alternative preferred embodiment of the present invention.

Turning now to FIG. 5, there is shown a perspective view of an alternative assembly according to a preferred embodiment of the present invention. Assembly 60 has clamp base 88 which is operably connectable to clamp assembly 63 and 65. Clamp assembly 63 has side clamp 66 in hinged connection to side clamp 68. Side clamp 66 has hinge section 74 that mates with side clamp 68 at hinge section 72. Hinge sections 72 and 74 have reciprocal interleaved members but any of a variety of hinge mechanism may be employed. Pin 70 is inserted into hinge sections 72 and 74 thereby making a flexible hinge joint.

Side section 66 has end section 99 that mates with end section 97 of side section 68 to form a male insert 100 for operable engagement to clamp base 88. Male section 100 has a threaded opening 90 for insertion of screw 96 through aperture 92 into opening 90. Screw 96 is inserted into lock washer 94 and tightened into opening 90 thereby drawing clamp assembly 63 into stable engagement to clamp base 88. Pads 76 and 77 and 80 and 82, are positioned on the inside circumference of clamp assemblies 63 and 65 respectively to provide cushioned support for the clamp when it is positioned around the riser. Alternatively, clamp assembly 63 could be configured of a single flexible piece of material in a circular configuration with end sections 97 and 99 mating to form male insert 100 and still have the same ability for stable engagement to clamp base 88.

Figure 6:
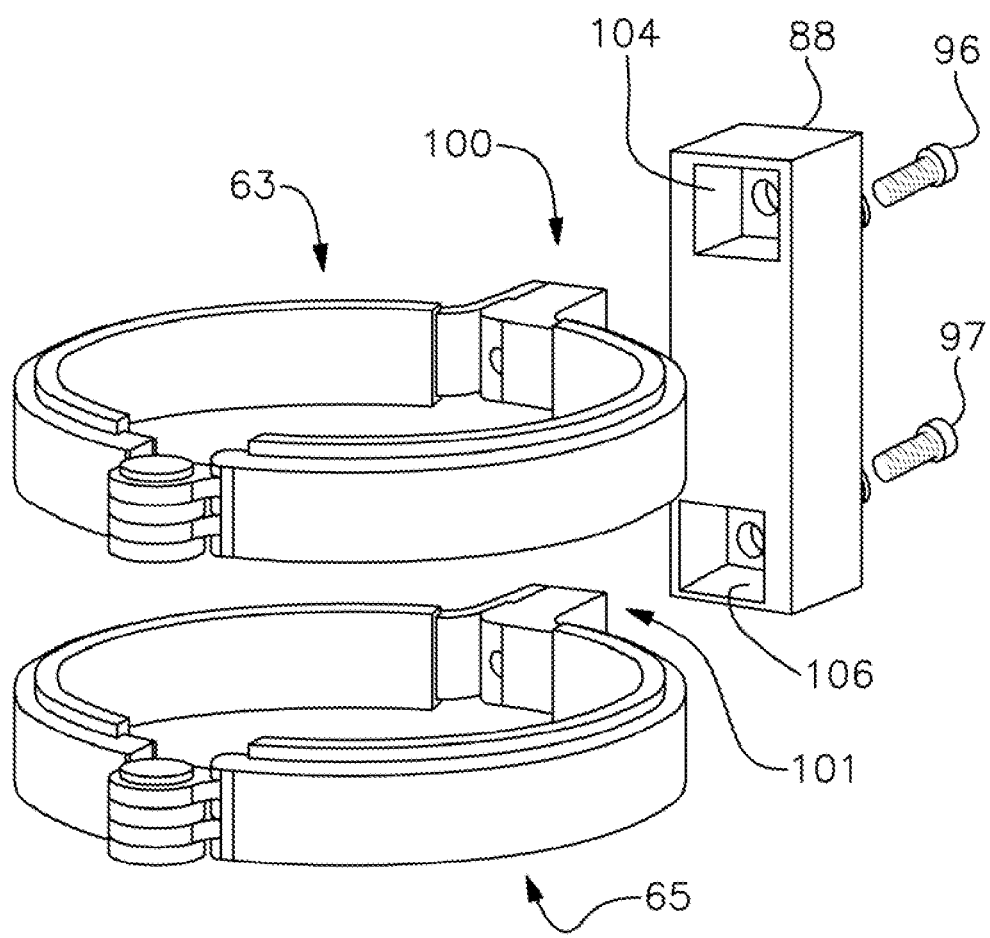
FIG. 6 shows another perspective view of an alternative preferred embodiment of the present invention.

Male inserts 100 and 101 are preferably configured with a tapered outer dimension so that upon engagement by screws 96 and 98, each wedges into clamp base 88. As shown in FIG. 6, male insert 100 is inserted into void 104 upon engagement of clamp assembly 63 being drawn into void 104 upon activation of screw 96. As is readily apparent, a tapered shape to male insert 100 provide stable engagement with void 104 when fully inserted. Void 104 may be preferably tapered in a reciprocal manner to facilitate stable engagement to male insert 100. Similarly, clamp assembly 65 is inserted into void 106 by male insert 101 and stably engaged.

Clamp assemblies 63 and 65 may be composed of a variety of materials including composite, rubber, synthetic, or metallic.

Assembly 60 as shown in FIGS. 5 and 6 may be connected in similar fashion as previously described to communication grasp 30 for holding various lines including multiplexed (MUX) hydraulic lines, choke lines, boost lines, an Installation/Workover Control Systems (IWOCS) line, and other umbilical lines.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the structures and methods of this invention have been described in terms of various embodiments, it will be apparent to those of skill in the art that other variations can be applied to the structures and/or methods and in the steps or in the sequence of steps of the method described herein without departing from the concept, spirit and scope of the invention.

We claim:

1. A clamp for placement about a riser within a floatation having at least two longitudinal gaps comprising:
   a. an assembly with a housing for releasably engaging at east one substantially planar flexible strap having two opposing flat sides for placement of said strap about an outside diameter of said riser;
   b. said strap having first and second ends wherein said first and second ends are attached to said housing through a slotted channel, wherein one of said, first or second end is releasably attached to said housing;
   c. a tapered wedge on said housing configured to fit within one of said gaps for selectively engaging said first and second ends of said strap on opposite sides of said wedge said wedge having a mating screw engaged to said housing while one of said flat sides of said strap wraps around in substantial contact with a portion of said outer diameter of said riser; and
   d. a support operably connected to said housing for releasably holding at least one cable.

2. The clamp as claimed in claim 1 wherein said strap is composed of a substantially metallic material.

3. The clamp as claimed in claim 1 further comprising a second strap releasably engaged to said housing.

4. The clamp as claimed in claim 1 further comprising a screw that moves said tapered wedge when said screw having a shaft is turned.

5. The clamp as claimed in claim 1 further comprising a stabilizer on said housing for frictional engagement to said riser.

6. The clamp as claimed in claim 1 wherein said support comprises a hinge having first and second arms each having a hinged end and a free end.

7. The clamp as claimed in claim 6 wherein said hinge forms a plurality of generally cylindrical passageways when in a closed position.

8. The clamp as claimed in claim 6 wherein said hinge is operably engaged in a locked position by a swivel arm pivotally mounted on said free end of one arm and releasably engaged to said free end of the other arm.

9. The clamp as claimed in claim 8 wherein said swivel arm further comprises a rotating handle for engagement of said two arms upon rotation.

10. A clamp for placement about a riser within a floatation having at least two longitudinal gaps comprising:
   a. an assembly with a housing for releasbly engaging at least one substantially planar flexible strap having two opposing flat sides for placement of said strap about an outside diameter of said riser;

b. said strap having first and second ends wherein said first and second ends are attached to said housing through a slotted channel, wherein one of said first or second end is releasably attached to said housing;

c. a tapered plate on said housing configured to fit within one of said gaps for selectively engaging said first and second end of said strap on opposite sides of said plate said plate having a mating screw engaged to said housing while one of said flat sides of said strap wraps around in substantial contact with a portion of said outer diameter of said riser, and d. a support operably connected to said housing for releasably holding at least one cable.

11. The clamp as claimed in claim 10 further comprising a screw that moves said plate when said screw having a shaft is turned.

12. The clamp as claimed in claim 10 further comprising a stabilizer on said housing for frictional engagement to said riser.

13. The clamp as claimed in claim 10 wherein said support comprises a hinge having first and second arms each having a hinged end and a free end.

14. The clamp as claimed in claim 13 wherein said hinge forms a plurality of generally cylindrical passageways when in a closed position.

15. The clamp as claimed in claim 13 wherein said hinge is operably engaged in a locked position by a swivel arm pivotally mounted on said free end of one arm and releasably engaged to said free end of the other arm.

16. The clamp as claimed in claim 15 wherein said swivel arm further comprises a rotating handle for engagement of said two arms upon rotation.

\* \* \* \* \*